US 6,612,284 B1

(12) United States Patent
Takagi et al.

(10) Patent No.: US 6,612,284 B1
(45) Date of Patent: Sep. 2, 2003

(54) DEVICE AND METHOD FOR ENGINE CONTROL

(75) Inventors: Noboru Takagi, Toyota (JP); Hiroyuki Mizuno, Toyota (JP); Naohide Fuwa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 90 days.

(21) Appl. No.: 10/018,344

(22) PCT Filed: Jun. 15, 2000

(86) PCT No.: PCT/JP00/03900

§ 371 (c)(1),
(2), (4) Date: Dec. 19, 2001

(87) PCT Pub. No.: WO00/79110

PCT Pub. Date: Dec. 28, 2000

(30) Foreign Application Priority Data

Jun. 22, 1999 (JP) .......................................... 11/175499

(51) Int. Cl.$^7$ ................................................. F02B 17/00
(52) U.S. Cl. ...................................... 123/295; 123/305
(58) Field of Search ................................. 123/295, 305

(56) References Cited

U.S. PATENT DOCUMENTS

| 5,967,114 A | * | 10/1999 | Yasuoka | 123/295 |
| 6,026,779 A | * | 2/2000 | Obata et al. | 123/295 |
| 6,058,906 A | * | 5/2000 | Yoshino | 123/295 |
| 6,062,191 A | * | 5/2000 | Ooba | 123/295 |
| 6,178,943 B1 | * | 1/2001 | Taga et al. | 123/295 |

FOREIGN PATENT DOCUMENTS

| JP | 08-189405 | 7/1996 |
| JP | 10-103135 | 4/1998 |
| JP | 11-036922 | 2/1999 |
| JP | 11-036926 | 2/1999 |
| JP | 11-072033 | 3/1999 |
| JP | 11-173184 | 6/1999 |
| JP | 11-247692 | 9/1999 |
| JP | 2000-120478 | 4/2000 |

* cited by examiner

Primary Examiner—Willis R. Wolfe
Assistant Examiner—Douglas A. Salser
(74) Attorney, Agent, or Firm—Kenyon & Kenyon (57) ABSTRACT

An engine is operated in a homogeneous charge combustion mode or a stratified charge combustion mode. An intensive target throttle angle is computed based on the running state of the engine, regardless of a combustion mode which is underway. The intensive target throttle angle reflects an engine torque which is demanded at the time of executing the homogeneous charge combustion mode. At the time of executing the homogeneous charge combustion mode, the degree of opening of a throttle valve is adjusted based on the intensive target throttle angle to adjust the engine torque. At the time of executing the stratified charge combustion mode, a fuel injection amount is adjusted based on the intensive target throttle angle to adjust the engine torque. In other words, even in case where either of the two combustion modes is executed, the engine torque is adjusted based on the intensive target throttle angle. It is therefore possible to easily match engine torque characteristics between these different combustion modes.

15 Claims, 8 Drawing Sheets

DEVICE AND METHOD FOR ENGINE CONTROL

BACKGROUND OF THE INVENTION

The present invention relates to a control device and control method for an engine of the type that switches the combustion mode.

In an ordinary vehicular engine, air sucked into a combustion chamber via an intake passage and fuel to be injected from a fuel injection valve are blended to form an air-fuel mixture. The engine generates drive power by burning the air-fuel mixture in the combustion chambers. A throttle valve is provided in the intake passage. In accordance with the amount of manipulation of the acceleration pedal by a driver (hereinafter simply called "acceleration manipulation amount"), the amount of air to be led into the combustion chambers is regulated by the throttle valve. Accordingly, the amount of the air-fuel mixture to be filled in the combustion chambers changes, thereby adjusting the output torque of the engine.

An electronic throttle control apparatus disclosed in Japanese Patent Laid-Open No. Hei 10-103135 executes various kinds of electronic controls associated with automatic adjustment of the engine torque, such as traction control to prevent slipping of wheels and auto cruise control to keep the vehicle speed constant. When those controls are performed, the throttle angle based on the acceleration manipulation amount is corrected according to various parameters representing the running states of a vehicle other than the acceleration manipulation amount. As a result, the amount of intake air is adjusted to adjust the engine torque to a demanded value.

Recently, engines of the type that switches the combustion mode in accordance with the running state of the engine have been proposed and made into practical use in order to satisfy both an improvement on fuel efficiency and acquisition of sufficient engine power at the same time. Such a type of engine is disclosed in, for example, Japanese Patent Laid-Open No. Hei 8-189405.

The engine disclosed in the publication is operated in homogeneous charge combustion mode in high engine speed mode or high load mode where high power is demanded. At the time of operation in the homogeneous charge combustion mode, fuel is injected into a combustion chamber in the suction stroke of the engine. The injected fuel is homogeneously mixed with air and the homogeneous mixture of air and fuel is ignited by an ignition plug.

In low engine speed mode or low load mode where very high power is not demanded, the engine is operated in stratified charge combustion mode. At the time of operation in the stratified charge combustion mode, fuel is injected into the combustion chamber in the compression stroke of the engine. The injected fuel hits against the dent that is provided at the top of the piston and is gathered around the ignition plug, thus forming an air-fuel mixture with a high fuel concentration around the ignition plug. Therefore, the ignition by the ignition plug is carried out favorably. What is more, as the average air-fuel ratio in the combustion chamber is set greater than the stoichiometric air-fuel ratio, the fuel efficiency is improved. Further, the throttle valve is opened wider than that in homogeneous charge combustion mode to set the average air-fuel ratio in the air fuel mixture greater than the stoichiometric air-fuel ratio, the pumping loss is reduced.

In the engine of the above-described combustion mode switching type, various kinds of electronic controls associated with automatic adjustment of the engine torque, such as the traction control and auto cruise control, are executed. When the engine is operated in homogeneous charge combustion mode, as mentioned above, the throttle angle is corrected in accordance with various parameters representing the vehicle's running state other than the acceleration manipulation amount. As a result, the amount of intake air is adjusted to provide the necessary engine torque. The fuel injection amount is determined in accordance with the amount of intake air that is obtained as a result of adjusting, for example, the throttle angle, and is not determined in direct consideration of the demanded value for the engine torque.

When the engine is operated in stratified charge combustion mode, on the other hand, it is hard to change the engine torque even if the amount of intake air is adjusted by changing the throttle angle. Therefore, the engine torque is adjusted in accordance with the fuel injection amount. Specifically, the fuel injection amount is basically acquired based on the acceleration manipulation amount in stratified charge combustion mode. The obtained fuel injection amount is corrected in accordance with various parameters representing the vehicle's running state other than the acceleration manipulation amount. As a result, the required engine torque is obtained. The throttle angle is determined according to the fuel injection amount in such a way as to become a value suitable for stratified charge combustion, and is not determined in direct consideration of the demanded value for the engine torque.

As mentioned above, the throttle angle is used as a control value for adjusting the engine torque in homogeneous charge combustion mode while the fuel injection amount is used as a control value for adjusting the engine torque in stratified charge combustion mode. If the engine torque is adjusted by different control values according to the combustion mode of the engine, however, it becomes difficult to match the engine torque characteristic between the homogeneous charge combustion mode and the stratified charge combustion mode.

To execute the homogeneous charge combustion mode favorably, the demanded engine torque value should be reflected on the throttle angle accurately. To execute the stratified charge combustion mode favorably, the demanded engine torque value should be reflected on the fuel injection amount precisely. This requires that an experiment for matching the throttle angle in homogeneous charge combustion mode with the demanded engine torque value and an experiment for matching the fuel injection amount in stratified charge combustion mode with the demanded engine torque value should be conducted beforehand. That is, an experiment should be conducted for each of two different control values of the throttle angle and fuel injection amount, so that the experiments become troublesome.

SUMMARY OF THE INVENTION

Accordingly, it is an object of the present invention to provide a device and method for engine control, which can easily match the engine torque characteristics between a plurality of different combustion modes and can simplify experiments associated with a control value for controlling the engine torque.

To achieve the above object, the present invention provides a control device for an engine that generates a torque by burning a mixture of air and fuel in a combustion chamber. The engine is operated in a combustion mode selected from a first combustion mode and a second combustion mode. The engine torque is adjusted by first adjusting means when the engine is operated in the first combustion mode. The engine torque is adjusted by second adjusting means, different from the first adjusting means, when the engine is operated in the second combustion mode. The control device includes computation means for computing a torque-reflected value reflecting an engine torque demanded when the engine is operated in the first combustion mode, based on a running state of the engine; first control means for controlling the first adjusting means based on the torque-reflected value when the engine is operated in the first combustion mode; and second control means for controlling the second adjusting means based on the torque-reflected value when the engine is operated in the second combustion mode.

According to the present invention, the torque that is demanded of an engine is reflected on one torque-reflected value even in case where either the first combustion mode or the second combustion mode is executed. When the first combustion mode is executed, the first adjusting means is controlled based on the torque-reflected value to adjust the engine torque. When the second combustion mode is executed, the second adjusting means is controlled based on the torque-reflected value to adjust the engine torque. In other words, even in case where either of the two combustion modes is executed, the engine torque is adjusted based on the torque-reflected value that is a common target control value. It is therefore possible to easily match engine torque characteristics between these different combustion modes.

The present invention provides a control method for an engine for generating a torque by burning an air-fuel mixture of air and fuel in a combustion chamber. The engine is operated in a combustion mode selected from a first combustion mode and a second combustion mode. The engine torque is adjusted in accordance with a first control value when the engine is operated in the first combustion mode. The engine torque is adjusted by a second control value, different from the first control value, when the engine is operated in the second combustion mode. The control method includes a step of computing a torque-reflected value reflecting an engine torque demanded when the engine is operated in the first combustion mode, based on a running state of the engine; a step of controlling the first control value based on the torque-reflected value when the engine is operated in the first combustion mode; and a step of controlling the second control value based on the torque-reflected value when the engine is operated in the second combustion mode.

DETAILED DESCRIPTION

A description will be given below of one embodiment in which the present invention is adapted to a four-cylinder in-line direct injection type vehicular gasoline engine with reference to FIGS. 1 to 12.

Figure 1:
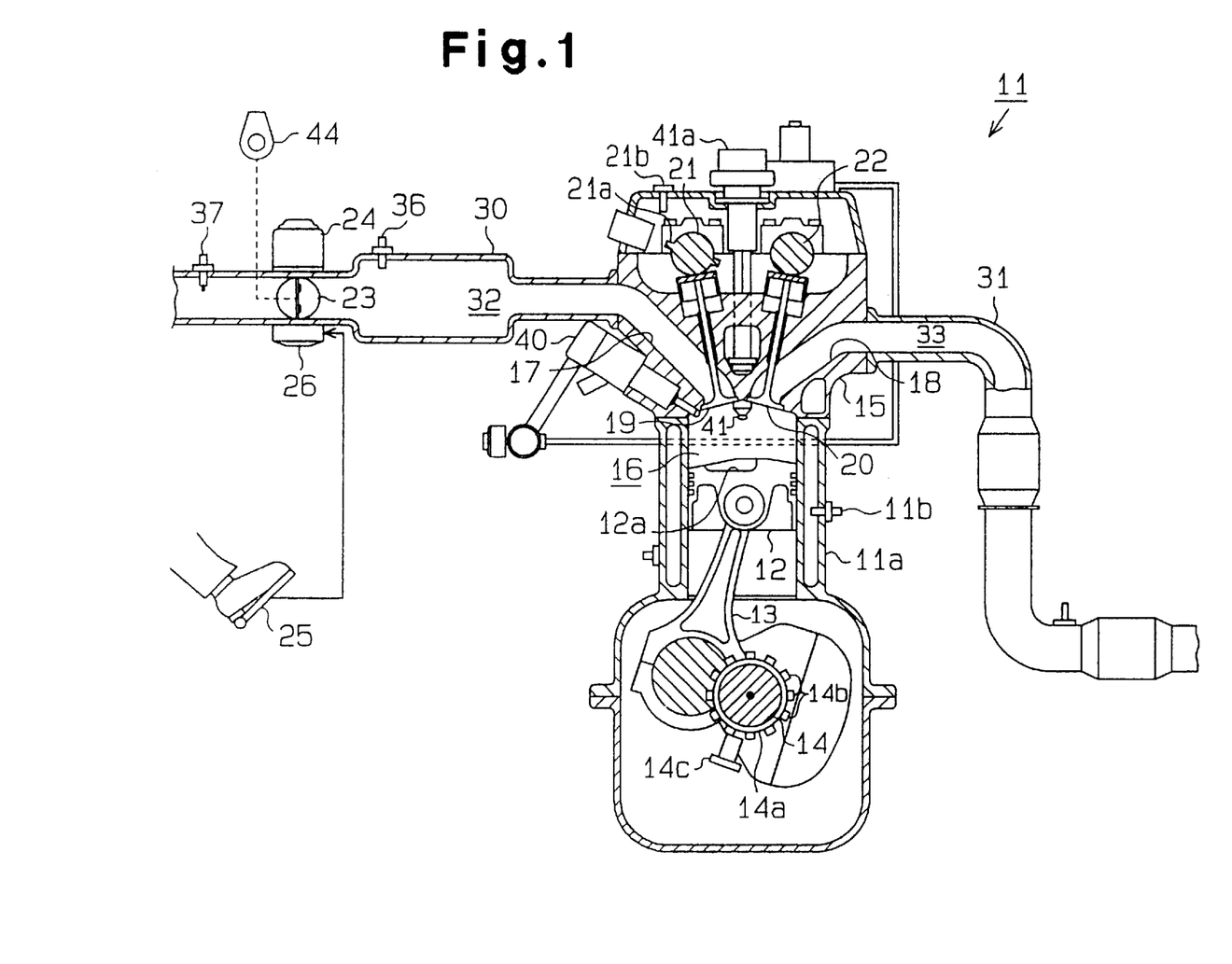
FIG. 1 is a cross-sectional view illustrating an engine according to one embodiment of the present invention.

As shown in FIG. 1, an engine 11 has four pistons 12 (only one shown) provided in a cylinder block 11a in a reciprocal manner. A dent 12a is formed in the top of each piston 12. Each piston 12 is coupled to a crankshaft 14, which is an output shaft, via a connecting rod 13. The reciprocal motion of the piston 12 is converted to the rotary motion of the crankshaft 14 by the connecting rod 13.

A signal rotor 14a is attached to the crankshaft 14. A plurality of projections 14b are provided on the outer surface of the signal rotor 14a at equal angular positions around the axis of the crankshaft 14. A crank position sensor 14c is so provided as to face the outer surface of the signal rotor 14a. As the crankshaft 14 rotates, the individual projections 14b on the signal rotor 14a pass, one by one, the position that faces the crank position sensor 14c. The crank position sensor 14c outputs a pulse-like detection signal in accordance with that passage.

The cylinder block 11a is provided with a coolant temperature sensor 11b, which detects a coolant temperature THW as the temperature of the engine 11. A cylinder head 15 is attached to the top of the cylinder block 11a. A combustion chamber 16 is formed between the cylinder head 15 and each piston 12. Intake ports 17 and exhaust ports 18, provided in the cylinder head 15, are connected to each combustion chamber 16. Intake valves 19 are provided in the intake ports 17. Exhaust valves 20 are provided in the exhaust ports 18.

An intake cam shaft 21 for driving the intake valves 19 and an exhaust cam shaft 22 for driving the exhaust valves 20 are rotatably supported on the cylinder head 15. Those cam shafts 21 and 22 are coupled to the crankshaft 14 via a timing belt and gears (neither shown). As the intake cam shaft 21 rotates, the intake valves 19 selectively connect and disconnect the intake ports 17 to and from the combustion chamber 16. As the exhaust cam shaft 22 rotates, the exhaust valves 20 selectively connect and disconnect the exhaust ports 18 to and from the combustion chamber 16.

At least one projection 21a is provided on the outer surface of one end of the intake cam shaft 21. A cam position sensor 21b for detecting the projection 21a is provided on the cylinder head 15. As the intake cam shaft 21 rotates, the projection 21a passes the position that faces the cam position sensor 21b. The cam position sensor 21b generates a detection signal in accordance with that passage.

An intake manifold 30 is connected to the intake ports 17. An exhaust manifold 31 is connected to the exhaust ports 18. The intake manifold 30 and the intake ports 17 constitute an intake passage 32, and the exhaust manifold 31 and the exhaust ports 18 constitute an exhaust passage 33. A throttle valve 23 is disposed in an upstream portion of the intake passage 32. The throttle valve 23 is driven by a throttle motor 24 comprised of a DC motor to thereby regulate the amount of opening of the intake passage 32. The degree of opening of the throttle valve 23 (throttle angle) is detected by a throttle position sensor 44.

The throttle motor 24 is basically controlled based on the depression amount of an acceleration pedal 25 (acceleration depression amount ACCP) provided in the compartment of a car. As the driver of the car steps on the acceleration pedal 25, the acceleration depression amount ACCP is detected by an acceleration position sensor 26. Based on the detection signal of the acceleration position sensor 26, the throttle motor 24 is controlled to adjust the degree of opening of the throttle valve 23. As a result, the air-flow area of the intake passage 32 changes to regulate the amount of air that is supplied into the combustion chamber 16 from the intake passage 32.

Provided in intake passage 32 at the downstream of the throttle valve 23 is a vacuum sensor 36, which detects the internal pressure of the intake passage 32. Provided in intake passage 32 at the upstream of the throttle valve 23 is an air temperature sensor 37. The air temperature sensor 37 detects the temperature of air (intake air temperature THA) that passes through the intake passage 32.

Fuel injection valves 40, which directly inject fuel in the combustion chambers 16, and ignition plugs 41, which ignite the mixture of fuel and air filled in the combustion chambers 16, are provided in the cylinder head 15. The ignition timing for the air-fuel mixture by the ignition plug 41 is adjusted by an igniter 41a provided above the ignition plug 41.

The fuel that is injected into the combustion chamber 16 from the fuel injection valve 40 is mixed with the air that is taken into the combustion chamber 16 from the intake passage 32, thus forming the mixture of air and fuel in the combustion chamber 16. The air-fuel mixture in the combustion chamber 16 is ignited by the ignition plug 41 and burned, and the combustion gas is sent as an exhaust gas to the exhaust passage 33.

Figure 2:
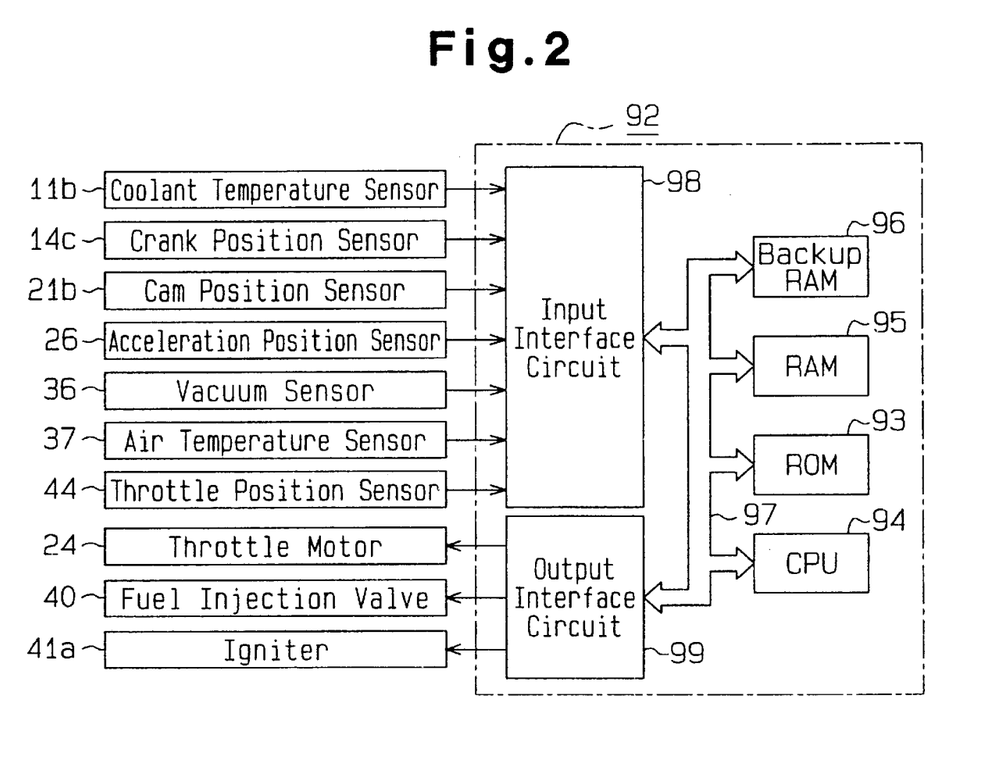
FIG. 2 is a block diagram showing the electric structure of a control device for the engine shown in FIG. 1.
Figure 3:
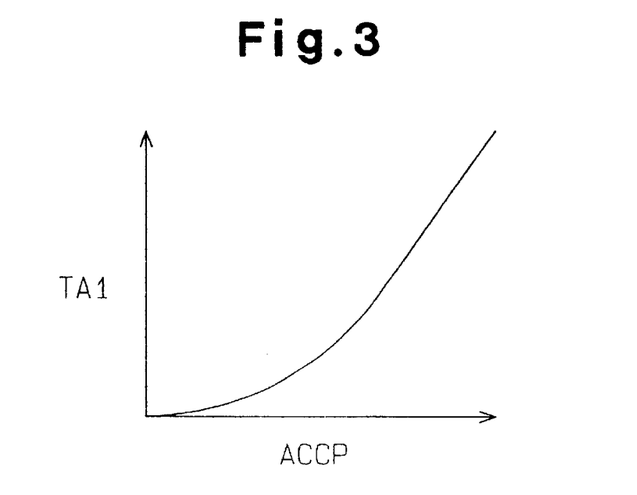
FIG. 3 is a graph showing the transition of a non-linear target throttle angle TA1 with respect to a change in acceleration depression amount ACCP.

The electric structure of the control device for the engine 11 shown in FIG. 1 will now be described referring to FIG. 2. The control device has an electronic control unit. (hereinafter called "ECU") 92, which performs control on the running state of the engine 11, such as fuel injection amount control, fuel injection timing control, ignition timing control and throttle angle control. The ECU 92 is constructed as an arithmetic logic circuit, which includes a ROM 93, CPU 94, RAM 95 and backup RAM 96.

The ROM 93 stores various control programs and maps, which are referred to at the time of running the various control programs. The CPU 94 perform arithmetic operations based on the control programs and maps stored in the ROM 93. The RAM 95 temporarily stores the results of operations in the CPU 94 and data or the like input from individual sensors. The backup RAM 96 is a non-volatile memory, which saves data stored in the RAM 95 at the time the engine 11 is stopped. The ROM 93, CPU 94, RAM 95 and backup RAM 96 are connected to one another and are connected to an input interface circuit 98 and an output interface circuit 99, by a bus 97.

Connected to the input interface circuit 98 are the coolant temperature sensor 11b, the crank position sensor 14c, the cam position sensor 21b, the acceleration position sensor 26, the vacuum sensor 36, the air temperature sensor 37 and the throttle position sensor 44. Connected to the output interface circuit 99 are the throttle motor 24, the fuel injection valves 40 and the igniters 41a.

The ECU 92 switches the combustion mode of the engine 11 between a stratified charge combustion mode and a homogeneous charge combustion mode in accordance with the running state of the engine 11. Specifically, the ECU 92 acquires an engine speed NE based on the detection signal from the crank position sensor 14c. The ECU 92 also acquires a basic fuel injection amount Qbse, which represents the engine load, based on an intensive target throttle angle TAt to be discussed later and he engine speed NE. Then, the ECU 92 selects the combustion ode of the engine 11 that is to be executed, based on the basic fuel injection amount Qbse and the engine speed NE. For example, the ECU 92 selects the homogeneous charge combustion mode in the high speed or high load state of the engine 11 and selects the stratified charge combustion mode in the low speed or low load state of the engine 11.

In case where the homogeneous charge combustion mode is selected, the ECU 92 causes the fuel injection valve 40 to inject fuel whose amount corresponds to a final fuel injection amount Qfin obtained from the basic fuel injection amount Qbse during the suction stroke of the engine 11. As a result, a homogeneous air-fuel mixture having an air-fuel ratio equal to or greater than the stoichiometric air-fuel ratio is formed in the combustion chamber 16. The ECU 92 further controls the throttle motor 24 and the igniter 41a in such a way that the throttle angle and the ignition timing become suitable for the homogeneous charge combustion.

In case where the stratified charge combustion mode is selected, the ECU 92 causes the fuel injection valve 40 to inject fuel whose amount corresponds to the final fuel injection amount Qfin obtained from the basic fuel injection amount Qbse during the compression stroke of the engine 11. As a result, a heterogeneous air-fuel mixture is formed in the combustion chamber 16. The average air-fuel ratio of the entire air-fuel mixture in the combustion chamber 16 is set greater than the air-fuel ratio of the air-fuel mixture in the homogeneous charge combustion mode. The ECU 92 controls the throttle motor 24 and the igniter 41a in such a way that the throttle angle and the ignition timing become suitable for the stratified charge combustion.

At the time stratified charge combustion mode is performed, the fuel injected during the compression stroke of the engine 11 enters the dent 12a (see FIG. 1) of the piston 12 and is gathered around the ignition plug 41. Therefore, an air-fuel mixture having a high fuel concentration is formed around the ignition plug 41 and ignition by the ignition plug 41 is carried out favorably. What is more, because the average air-fuel ratio of the entire air-fuel mixture in the combustion chamber 16 is set greater than that in the homogeneous charge combustion mode, the fuel efficiency is improved. Further, as the throttle angle is made larger than that in the homogeneous charge combustion mode in order to increase the average air-fuel ratio of the air-fuel mixture, the pumping loss is reduced.

Figure 4:
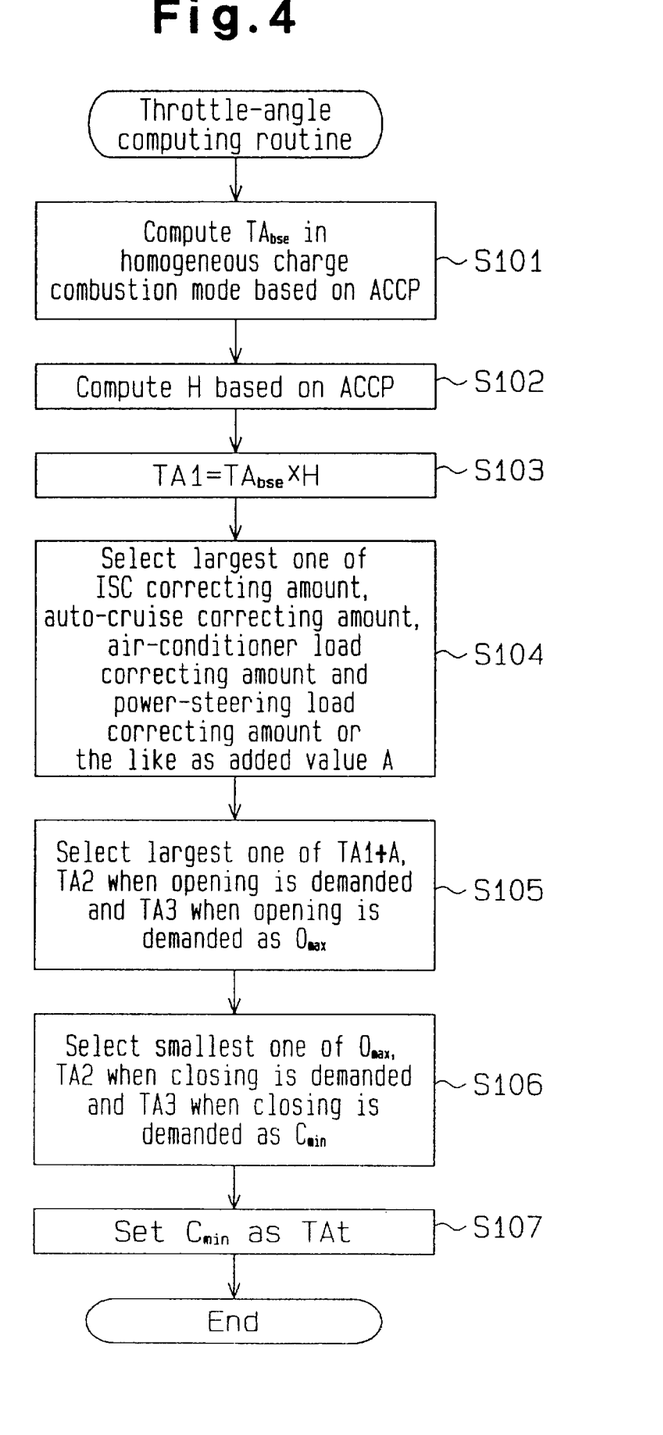
FIG. 4 is a flowchart illustrating procedures of computing an intensive target throttle angle TAt.

FIG. 4 is a flowchart illustrating procedures of computing the intensive target throttle angle TAt. The intensive target throttle angle TAt is used as a value for controlling the output torque of the engine 11 even in case where either the homogeneous charge combustion mode or the stratified charge combustion mode is executed. The computation routine in FIG. 4 is executed in an interruption of every predetermined time through the ECU 92.

The ECU 92 first computes a basic throttle angle TAbse suitable for homogeneous charge combustion based on the acceleration depression amount ACCP, regardless of the current combustion mode, in step S101. The greater the acceleration depression amount ACCP becomes, the larger the basic throttle angle TAbse becomes. Next, in step S102, the ECU 92 computes a non-linear correcting coefficient H based on the acceleration depression amount ACCP. In step S103, the ECU 92 computes a non-linear target throttle angle TA1 by multiplying the basic throttle angle TAbse by the non-linear correcting coefficient H. The non-linear target throttle angle TA1 changes as shown in, for example, FIG. 3 with respect to a change in acceleration depression amount ACCP in such a way that the optimal engine power torque characteristic is acquired with respect to the change in acceleration depression amount ACCP.

Next, in step S104, the ECU 92 selects the largest one of an ISC correcting amount, auto-cruise correcting amount, air-conditioner load correcting amount and power-steering load correcting amount as an addend value A. Those correcting amounts are for correcting the non-linear target throttle angle TA1 and the selected correcting amount is added as the addend value A to the non-linear target throttle angle TA1.

The output torque of the engine 11 is adjusted in accordance with not only the acceleration depression amount ACCP but also other various parameters representing the running states of the vehicle. The ISC correcting amount, auto-cruise correcting amount, air-conditioner load correcting amount and power-steering load correcting amount are to be added to the non-linear target throttle angle TA1 to adjust the output torque of the engine 11. In other words, those correcting amounts are values reflecting the torque value demanded of the engine 11 and are determined in accordance with various parameters representing the running states of the vehicle.

The ISC correcting amount is acquired when the idle speed control (ISC) is executed. The ISC is executed at the time the engine 11 is idling. At the time of executing the ISC, the output torque of the engine 11 is regulated by the ISC correcting amount so that the engine speed NE is adjusted to a predetermined value.

The auto-cruise correcting amount is acquired when the auto-cruise control for keeping the vehicle speed constant is executed. At the time of executing the auto-cruise control, the output torque of the engine 11 is regulated by the auto-cruise correcting amount so that the vehicle speed is kept constant.

The air-conditioner load correcting amount is acquired to compensate for the engine torque that is needed to drive the air conditioner mounted in the vehicle. At the time of driving the air conditioner, the output torque of the engine 11 is increased by the air-conditioner load correcting amount.

The power-steering load correcting amount is acquired to compensate for the engine torque that is needed to drive the power steering unit of the vehicle. At the time of driving the power steering unit, the output torque of the engine 11 is increased by the power-steering load correcting amount.

In step S105, the ECU 92 selects the largest one of a value obtained by adding the addend value A to the non-linear target throttle angle TA1, a shift target angle TA2 and a traction target angle TA3 as a maximum target angle Omax. The shift target angle TA2 is acquired when in-shift-mode torque control is executed. The traction target angle TA3 is acquired at the time of executing the traction control. The shift target angle TA2 and the traction target angle TA3 are acquired as values indicative of the throttle angle in order to adjust the output torque of the engine 11. In other words, those target angles TA2 and TA3 are values reflecting the torque value demanded of the engine 11 and are determined in accordance with various parameters representing the running states of the vehicle.

The in-shift-mode torque control is control for suppressing a shock, which is produced at the time of shifting the automatic transmission mounted in the vehicle. At the time of shifting the automatic transmission, the output torque of the engine 11 is adjusted by the shift target angle TA2, thereby suppressing a shift shock. The traction control is control intended to prevent slipping of wheels. At the time the vehicle is accelerating, for example, the output torque of the engine 11 is adjusted by the traction target angle TA3, thereby preventing slipping of wheels.

The shift target angle TA2 that is used in the step S105 is a value when it is necessary to increase the throttle angle in the in-shift-mode torque control. The traction target angle TA3 that is used in the step S105 is a value when it is necessary to increase the throttle angle in the traction control. When it is necessary to decrease the throttle angle in those controls, therefore, the shift target angle TA2 and the traction target angle TA3 are not used to determine the maximum target angle Omax in step S105.

In step S106, the ECU 92 selects, as a minimum target angle Cmin, the smallest one of the shift target angle TA2 when the throttle angle in the in-shift-mode torque control should be decreased and the traction target angle TA3 when the throttle angle in the traction control should be decreased.

In the next step S107, the ECU 92 sets the minimum target angle Cmin as the intensive target throttle angle TAt, then temporarily terminates this routine. In case where the minimum target angle Cmin is larger than a predetermined upper limit value, the upper limit value is set as the intensive target throttle angle TAt. In case where the minimum target angle Cmin is smaller than a predetermined lower limit value, the lower limit value is set as the intensive target throttle angle TAt.

As the routine in FIG. 4 is executed, the intensive target throttle angle TAt that reflects various control values including the added value A, the shift target angle TA2 and the traction target angle TA3, i.e., the torque values demanded of the engine 11, is acquired. To accurately reflect the torque values demanded of the engine 11 on the intensive target throttle angle TAt, experiments for matching the individual control values with the demanded engine torque values are conducted beforehand.

A description will now be given of the engine torque control that is executed in accordance with the intensive target throttle angle TAt.

At the time of driving in homogeneous charge combustion mode, the ECU 92 controls the throttle motor 24 to adjust the opening of the throttle valve 23 based on the intensive target throttle angle TAt and the real throttle angle TAr that is detected by the throttle position sensor 44.

At the time of controlling the throttle motor 24, the ECU 92 computes a compensation value TAh for compensating the motion of the throttle motor 24 based on the following equation (1).

$$TAh = TAr + Kd \times (dTAr/dt) \qquad (1)$$

In the equation (1), the dTAr/dt is a value obtained by differentiating the real throttle angle TAr with respect to time t. Kd is a predetermined coefficient. The compensation value TAh that is computed based on the equation (1) is closer to the intensive target throttle angle TAt than to the real throttle angle TAr while the intensive target throttle angle TAt is changing.

The ECU 92 computes a difference e2 between the intensive target throttle angle TAt and the compensation value TAh from the following equation (2). The ECU 92 controls the driving of the throttle motor 24 in such a way that the difference e2 approaches zero, i.e., the compensation value TAh approaches the intensive target throttle angle TAt.

$$TAt-TAh=e2 \quad (2)$$

Figure 5:
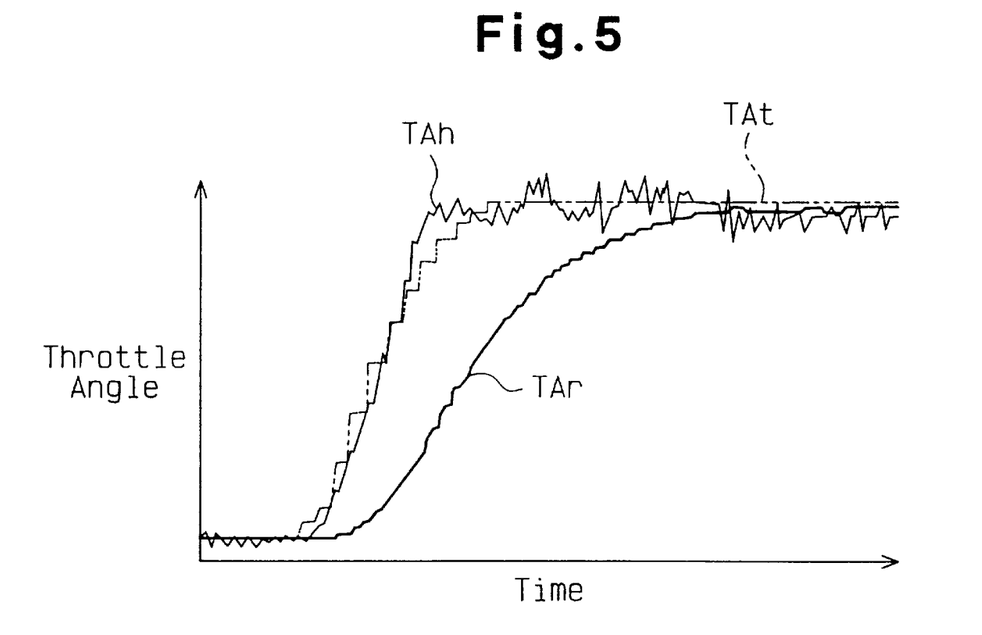
FIG. 5 is a time chart showing the transitions of a compensation value TAh with respect to a change in intensive target throttle angle TAt and a real throttle angle TAr.

FIG. 5 shows how the compensation value TAh and the real throttle angle TAr change when the intensive target throttle angle TAt changes with the passage of the time.

When the intensive target throttle angle TAt changes as indicated by the two-dot chain line in FIG. 5, the compensation value TAh changes accordingly in the vicinity of the intensive target throttle angle TAt as indicated by the thin solid line. By controlling the throttle motor 24 in such a way that the difference e2 between the compensation value TAh and the intensive target throttle angle TAt approaches zero, the real throttle angle TAr changes with a predetermined response delay as indicated by the thick solid line with respect to a change in the intensive target throttle angle TAt. Providing the real throttle angle TAr with such a response delay is to prevent the overshooting of the real throttle angle TAr.

Figure 10A:
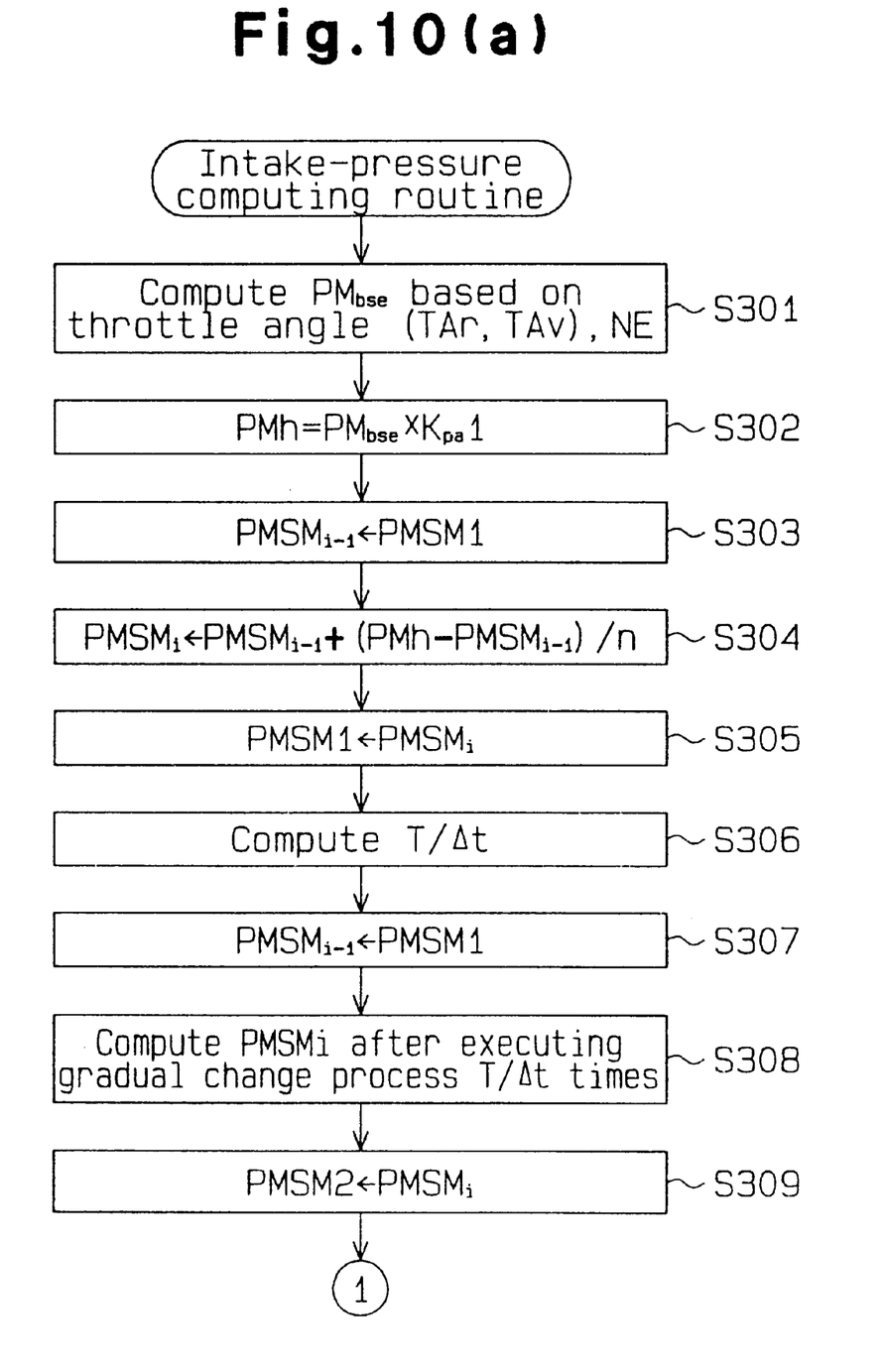
FIG. 10(a) is a flowchart illustrating procedures of computing a predicted intake pressure PMFWD and a virtual intake pressure PMv.
Figure 10B:
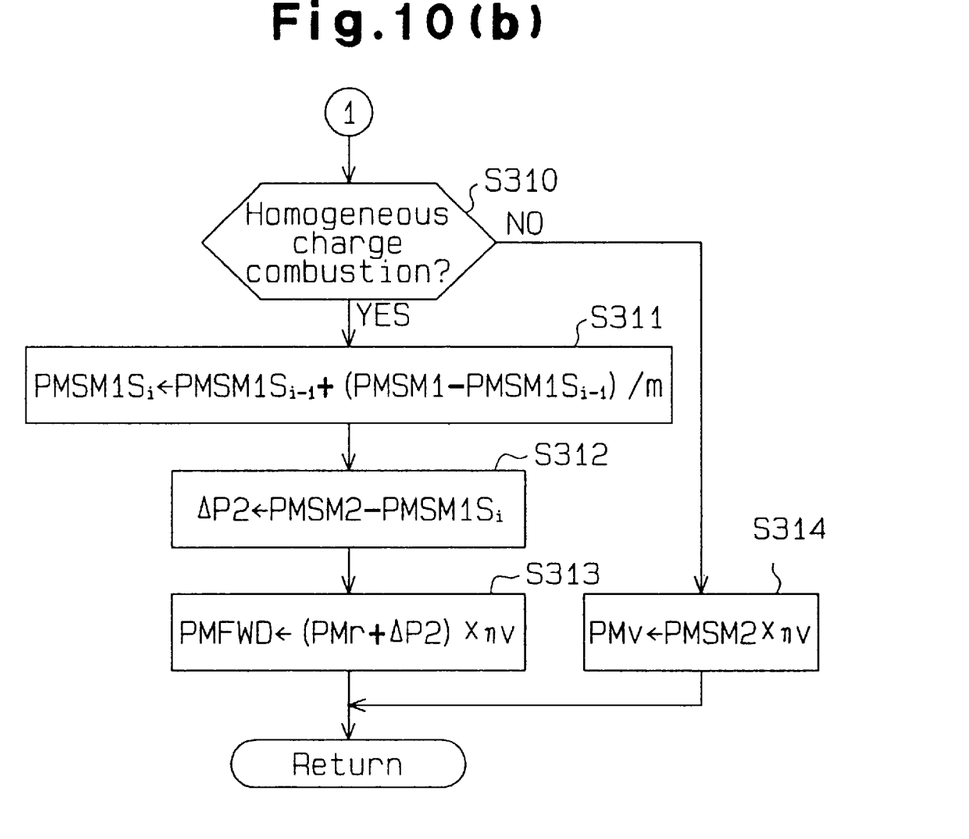
FIG. 10(b) is a flowchart illustrating the continuation of FIG. 10(a)
Figure 11:
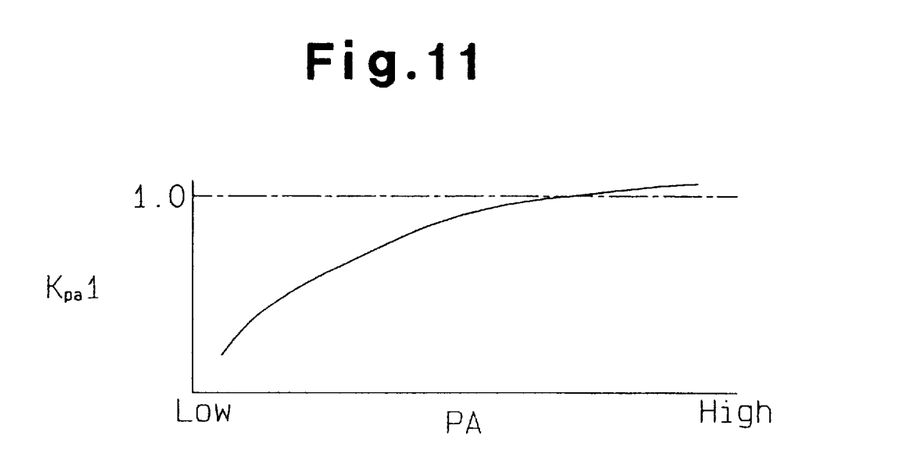
FIG. 11 is a map that is referred to at the time of computing an atmospheric-pressure correcting coefficient Kps1.

The ECU 92 also computes a predicted intake pressure PMFWD from the real throttle angle TAr and a real intake pressure PMr, which is detected by the vacuum sensor 36, or the like. The predicted intake pressure PMFWD is a predicted value of the intake pressure at the time of closing the intake valve 19 and the procedures of computing it will become apparent from an intake-pressure computing routine in FIG. 10(*a*) and FIG. 10(*b*) that will be discussed later.

The ECU 92 further computes the basic fuel injection amount Qbse based on the predicted intake pressure PMFWD and the engine speed NE. The greater the predicted intake pressure PMFWD and the engine speed NE, the larger the basic fuel injection amount Qbse becomes. The ECU 92 drives the fuel injection valve 40 to inject fuel whose amount corresponds to the final fuel injection amount Qfin obtained from the basic fuel injection amount Qbse into the combustion chamber 16 during the intake stroke of the engine 11. As a result, homogeneous charge combustion is carried out and the engine torque is adjusted to the demanded value.

When the engine 11 is operated in homogeneous charge combustion mode, as described above, the throttle angle is adjusted in accordance with the intensive target throttle angle TAt that reflects the torque value demanded of the engine 11, thereby determining the amount of intake air and the intake pressure. As a result, the output torque of the engine 11 is adjusted to the demanded value. The fuel injection amount is determined in accordance with the real throttle angle TAr and the predicted intake pressure PMFWD that reflects the real intake pressure PMr in such a way that the air-fuel ratio of the air-fuel mixture becomes a value suitable for homogeneous charge combustion.

When the engine 11 is operated in stratified charge combustion mode, on the other hand, the ECU 92 computes the real throttle angle TAr in case where it is assumed that the homogeneous charge combustion has been executed in the current running state of the engine, as a virtual throttle angle TAv based on the intensive target throttle angle TAt. Specifically, because the transition of the intensive target throttle angle TAt is approximately identical to the transition of the compensation value TAh as shown in FIG. 5, it is assumed first that TAh=TAt. On this assumption, the ECU 92 computes the real throttle angle TAr from the intensive target throttle angle TAt through the reverse procedures to those for the computation of the compensation value TAh based on the equation (1) or the like, and sets the real throttle angle TAr as the virtual throttle angle TAv.

Next, based on the virtual throttle angle TAv, the ECU 92 computes the intake pressure in case where it is assumed that the homogeneous charge combustion has been executed in the current running state of the engine, as a virtual intake pressure PMv. The procedures of computing the virtual intake pressure PMv will become apparent from the intake-pressure computing routine in FIG. 10(*a*) and FIG. 10(*b*) to be discussed later. Then, the ECU 92 computes the basic fuel injection amount Qbse based on the virtual intake pressure PMv and the engine speed NE. The greater the virtual intake pressure PMv and the engine speed NE, the larger the basic fuel injection amount Qbse becomes. The ECU 92 drives the fuel injection valve 40 to inject fuel whose amount corresponds to the final fuel injection amount Qfin obtained from the basic fuel injection amount Qbse into the combustion chamber 16 during the compression stroke of the engine 11. As a result, stratified charge combustion is carried out and the engine torque is adjusted to the demanded value.

When the engine 11 is operated in stratified charge combustion mode, as described above, the fuel injection amount is adjusted in accordance with the intensive target throttle angle TAt that reflects the torque value demanded of the engine 11, so that the output torque of the engine 11 is adjusted to the demanded value.

In accordance with the basic fuel injection amount Qbse, the ECU 92 computes an in-stratified-charge-combustion-mode target throttle angle TAts, which is a target throttle angle suitable for the stratified charge combustion. The in-stratified-charge-combustion-mode target throttle angle TAts is determined in such a way that the amount of intake air or the air-fuel ratio of the air-fuel mixture becomes a value suitable for the stratified charge combustion. Through procedures similar to those in homogeneous charge combustion mode, the ECU 92 also computes the compensation value TAh based on the in-stratified-charge-combustion-mode target throttle angle TAts and controls the throttle motor 24 based on the compensation value TAh and the real throttle angle TAr. As a result, the real throttle angle TAr changes with a predetermined response delay with respect to a change in the in-stratified-charge-combustion-mode target throttle angle TAts, thus preventing the overshooting of the real throttle angle TAr, as in the homogeneous charge combustion mode.

Figure 6:
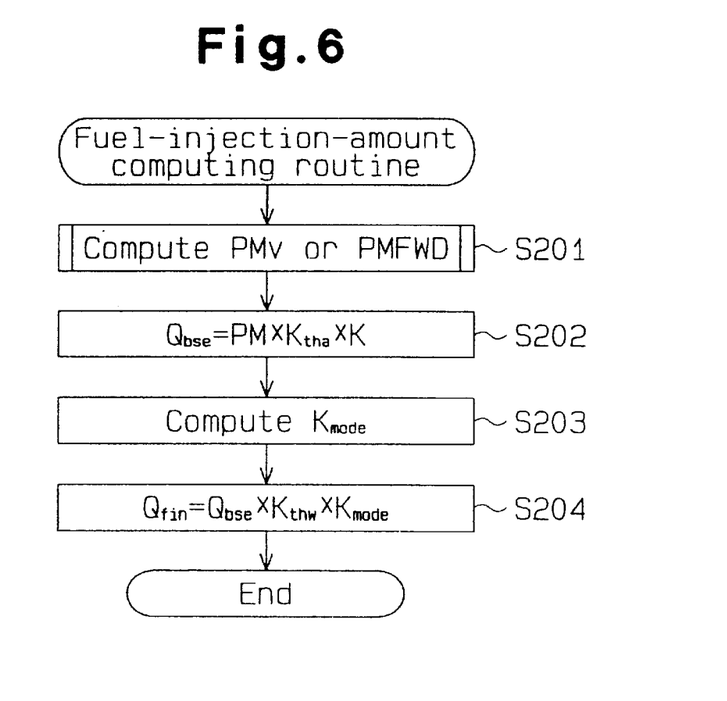
FIG. 6 is a flowchart illustrating procedures of computing a final fuel injection amount Qfin.
Figure 7:
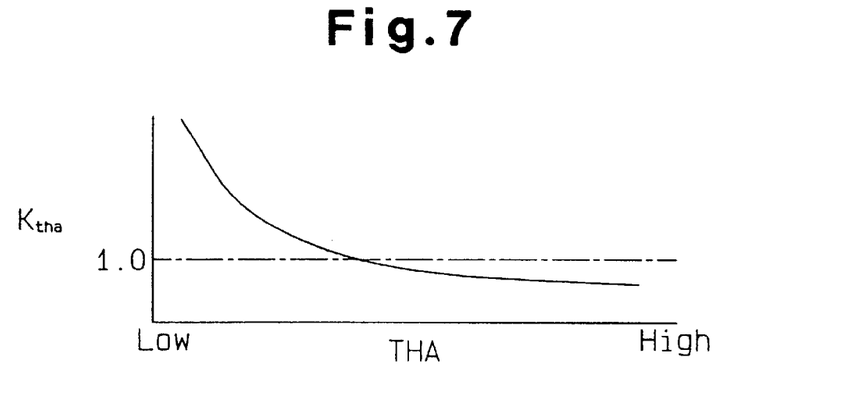
FIG. 7 is a map that is referred to at the time of computing an intake-air-temperature correcting coefficient Ktha.
Figure 8:
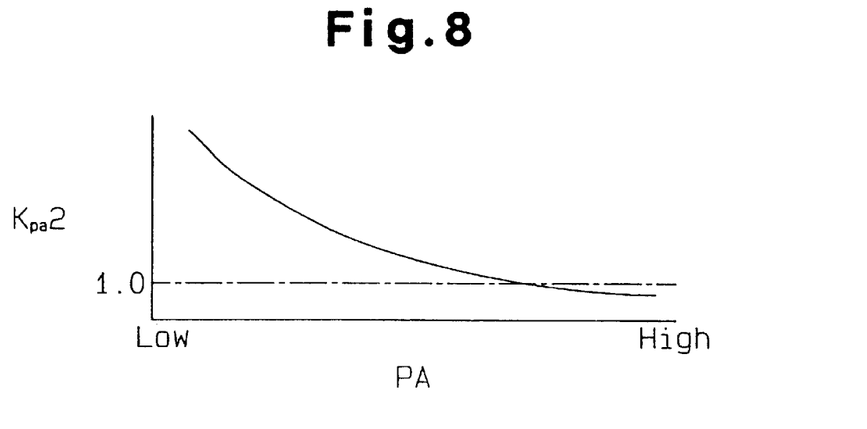
FIG. 8 is a map that is referred to at the time of computing an atmospheric-pressure correcting coefficient Kpa2.
Figure 9:
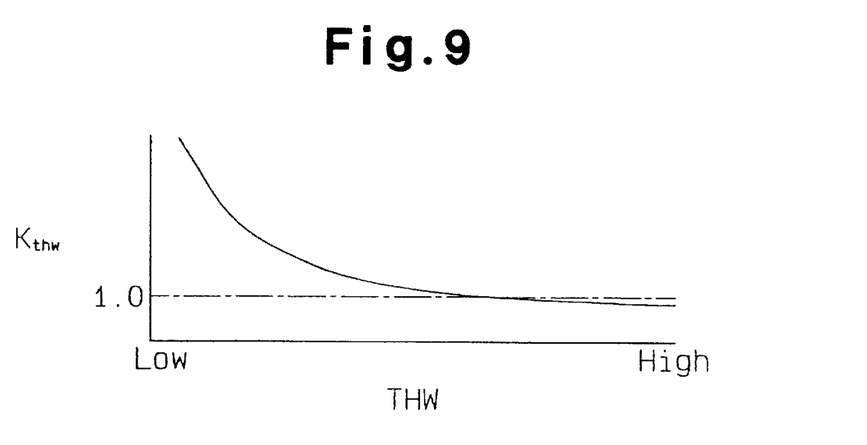
FIG. 9 is a map that is referred to at the time of computing a water-temperature correcting coefficient Kthw.

The procedures of computing the final fuel injection amount Qfin will now be described with reference to a flowchart in FIG. 6. The fuel-injection-amount computing routine illustrated in FIG. 6 is executed in an interruption of every predetermined time through the ECU 92.

In step S201, the ECU 92 first computes the virtual intake pressure PMv or the predicted intake pressure PMFWD. The procedures of computing the virtual intake pressure PMv and the predicted intake pressure PMFWD will become apparent from the intake-pressure computing routine in FIG. 10(*a*) and FIG. 10(*b*) to be discussed later.

In homogeneous charge combustion mode the ECU 92 computes various control values needed for controls according to the engine load, such as fuel injection control and ignition timing control, based on the predicted intake pressure PMFWD and the engine speed NE. Based on those control values, the ECU 92 controls the engine 11 according to the engine load. In stratified charge combustion mode the ECU 92 computes various control values needed for controls according to the engine load based on the virtual intake pressure PMv and the engine speed NE, and the ECU 92 controls the engine 11 according to the engine load based on those control values.

Next, in step S202, the ECU 92 uses the virtual intake pressure PMv or the predicted intake pressure PMFWD as an intake pressure PM and computes the basic fuel injection amount Qbse from the following equation (3). The basic fuel injection amount Qbse is calculated by multiplying the intake pressure PM by an intake-air-temperature correcting coefficient Ktha and a predetermined constant K.

$$Qbse = PM \times Ktha \times K \qquad (3)$$

Note that a volumetric efficiency ηv is used in computing the virtual intake pressure PMv and the predicted intake pressure PMFWD, which will be discussed later referring to FIG. 10(*a*) and FIG. 10(*b*). The intake-air-temperature correcting coefficient Ktha in the equation (3) is for compensating for a change in the volumetric efficiency ηv, which is caused by a change in intake air temperature THA. The ECU 92 acquires the intake air temperature THA based on the detection signal from the air temperature sensor 37 and computes the intake-air-temperature correcting coefficient Ktha based on the intake air temperature THA referring to the map in FIG. 7. As the intake air temperature THA becomes higher, the intake-air-temperature correcting coefficient Ktha becomes smaller. The lower the intake air temperature THA, therefore, the greater the basic fuel injection amount Qbse becomes.

In step S203, the ECU 92 computes a mode correcting coefficient Kmode. The mode correcting coefficient Kmode is a correcting coefficient for compensating for a difference in demanded fuel injection amount, which is originated from the difference in combustion efficiency between homogeneous charge combustion and stratified charge combustion. The ECU 92 computes the mode correcting coefficient Kmode according to the current combustion mode. The mode correcting coefficient Kmode is set to 1.0 in homogeneous charge combustion mode where the combustion efficiency becomes lower than that in stratified charge combustion. The combustion efficiency becomes lower in homogeneous charge combustion mode than in stratified charge combustion mode because the pump loss or the cooling loss becomes greater in homogeneous charge combustion mode than in stratified charge combustion mode.

In stratified charge combustion mode where the combustion efficiency becomes higher, the ECU 92 calculates the final mode correcting coefficient Kmode by multiplying, for example, the basic mode correcting coefficient Kmode of 0.8 by an atmospheric-pressure correcting coefficient Kpa2. The pump loss of the engine 11 changes according to the atmospheric pressure PA and as the atmospheric pressure PA falls, the difference in pump loss between homogeneous charge combustion and stratified charge combustion becomes smaller. So, the ECU 92 computes the atmospheric-pressure correcting coefficient Kpa2 by referring to the map in FIG. 8 based on the atmospheric pressure PA. The atmospheric pressure PA is acquired based on the detection signal from the vacuum sensor 36 when the engine 11 is activated. The lower the atmospheric pressure PA, the greater the atmospheric-pressure correcting coefficient Kpa2 becomes, and the higher the atmospheric pressure PA, the smaller the atmospheric-pressure correcting coefficient Kpa2 becomes. As the basic mode correcting coefficient Kmode of 0.8 is multiplied by the atmospheric-pressure correcting coefficient Kpa2, the final mode correcting coefficient Kmode is set to a large value, e.g., 0.85, when the atmospheric pressure PA is low.

The ECU 92 computes a final fuel injection amount Qfin by multiplying the basic fuel injection amount Qbse by a coolant-temperature correcting coefficient Kthw and the mode correcting coefficient Kmode in the subsequent step S204, and then temporarily terminates this routine. The coolant-temperature correcting coefficient Kthw is a correcting coefficient for compensating for a change in combustion efficiency, such as a frictional loss originated from a change in coolant temperature THW. The ECU 92 acquires the coolant temperature THW based on the detection signal from the coolant temperature sensor 11*b* and computes the coolant-temperature correcting coefficient Kthw by referring to the map in FIG. 9 based on the coolant temperature THW. The higher the coolant temperature THW, the smaller the coolant-temperature correcting coefficient Kthw becomes. As the coolant temperature THW becomes lower, therefore, the final fuel injection amount Qfin is increased.

As the basic fuel injection amount Qbse is corrected by the mode correcting coefficient Kmode in the above-described manner, the final fuel injection amount Qfin is adjusted in accordance with the difference in combustion efficiency between combustion modes. In stratified charge combustion mode where the combustion efficiency is high, the final fuel injection amount Qfin is decreased than in homogeneous charge combustion mode. As fuel injection control is executed based on the final fuel injection amount Qfin that is computed in consideration of the difference in combustion efficiency between combustion modes, the precision of the engine power torque control based on fuel injection amount control is improved when either combustion mode is carried out.

Further, the pump loss of the engine 11 differs between stratified charge combustion mode and homogeneous charge combustion mode, and the difference in pump loss between those combustion modes varies according to the atmospheric pressure PA. Because the mode correcting coefficient Kmode that is used in computing the final fuel injection amount Qfin is corrected by the atmospheric-pressure correcting coefficient Kpa2, however, reduction in the precision of the engine power torque control caused by changes in the difference in pump loss according to the atmospheric pressure PA is prevented.

Now, the process of step S201 in FIG. 6 or the procedures of computing the predicted intake pressure PMFWD and the virtual intake pressure PMv will be elaborated with reference to the flowcharts in FIG. 10(*a*) and FIG. 10(*b*).

As shown in FIG. 10(*a*), in step S301, the ECU 92 first computes a basic intake pressure PMbse based on the current real throttle angle TAr or the virtual throttle angle TAv and the engine speed NE. The basic intake pressure PMbse is computed based on the real throttle angle TAr and the engine speed NE in homogeneous charge combustion mode, and is computed based on the virtual throttle angle TAv and the engine speed NE in stratified charge combustion mode.

In step S302, the ECU 92 computes a post-correction intake pressure PMh by multiplying the basic intake pressure PMbse by an atmospheric-pressure correcting coefficient Kps1. The atmospheric-pressure correcting coefficient Kps1 is computed based on the atmospheric pressure PA by referring to a map in FIG. 11. The higher the atmospheric pressure PA, the greater the atmospheric-pressure correcting coefficient Kps1 becomes. The higher the atmospheric pressure PA, therefore, the greater the post-correction intake pressure PMh becomes.

The process of the next step S303 is associated with the subsequent processes of steps S304 and S305. That is, in step S304, a gradual change value PMSM is computed by subjecting the post-correction intake pressure PMh to a gradual change process, and in step S305, the gradual change value PMSM is stored as a first stored value PMSM1. In step S303, the ECU 92 sets the first stored value PMSM1 stored in the previous process of step S305 as a previous gradual change value PMSMi−1.

The reason for storing the gradual change value PMSM computed in the gradual change process of step S304 as the first stored value PMSM1 in step S305 is that another process is executed using the gradual change value PMSM in the process of step S308 to be discussed later and the gradual change value PMSM is changed by that process. Even in this case, the gradual change process in step S304 can be performed adequately by setting the first stored value PMSM1 to the previous gradual change value PMSMi−1 in the step S303.

After executing the process of step S303, the ECU 92 computes a current gradual change value PMSMi based on the following equation (4) in step S304. That is, the previous gradual change value PMSMi−1 is subtracted from the post-correction intake pressure PMh in normal mode, then division by a predetermined value n is performed and the result of the division is added to the previous gradual change value PMSMi−1 to compute the current gradual change value PMSMi.

$$PMSMi = PMSMi-1 + (PMh - PMSMi-1)/n \quad (4)$$

Figure 12:
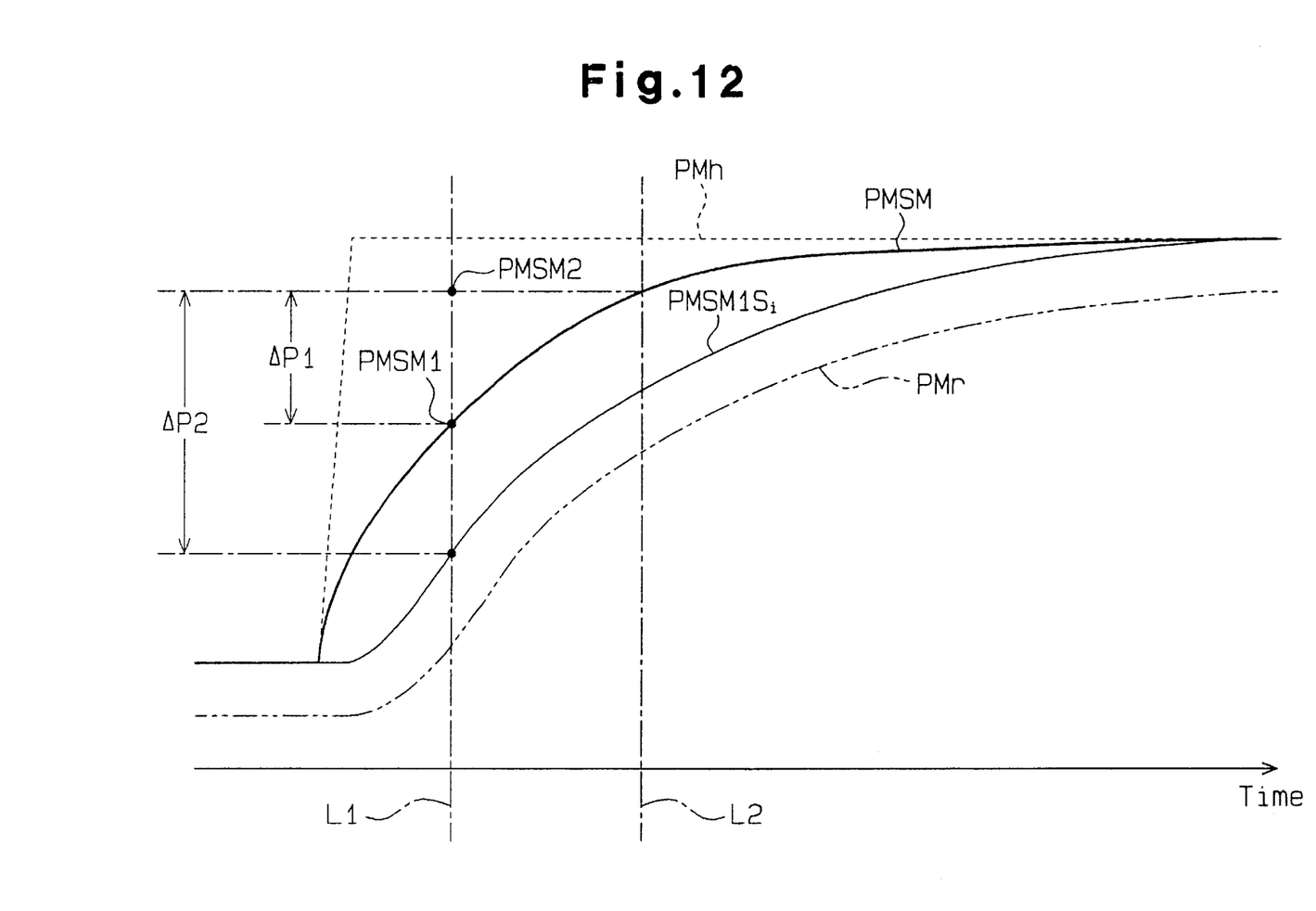
FIG. 12 is a time chart showing the transitions of an post-correction intake pressure PMh, a gradual change value PMSM, a filter output PMSM1Si and a real intake pressure PMr.

FIG. 12 shows the transitional tendency of the gradual change value PMSM with respect to a change in the post-correction intake pressure PMh. In the diagram, the transition of the post-correction intake pressure PMh is indicated by the broken line and the transition of the gradual change value PMSM by the thick solid line. The two-dot chain line shows how the real intake pressure PMr changes whereas the post-correction intake pressure PMh, which is computed through a map computation, or the like, changes as indicated by the broken line.

As apparent from FIG. 12, when the post-correction intake pressure PMh changes as indicated by the broken line in accordance with a change in, for example, the acceleration depression amount ACCP, the gradual change value PMSM gently changes as indicated by the thick solid line with respect to a change in the post-correction intake pressure PMh. How gentle the gradual change value PMSM changes with respect to a change in the post-correction intake pressure PMh is determined by the predetermined value n in the equation (4). The predetermined value n is computed based on the post-correction intake pressure PMh and the engine speed NE by referring to an unillustrated map, which is preset through experiments or the like.

When the gradual change value PMSM computed in step S304 is stored as the first stored value PMSM1 in step S305, the flow proceeds to step S306. The processes of steps S306 to S308 are for predicting and computing the gradual change value PMSM at the time of closing the intake valve 19 at present.

In step S306, the ECU 92 computes the number of times, T/Δt, the process in step S304 is performed (the number of gradual change processes) since the present time until the closing of the intake valve 19. That is, the number of gradual change processes T/Δt is computed by acquiring a time T from the present time to the time at which the intake valve 19 is closed and dividing the time T by an execution period Δt of this routine.

Next, in step S307, the ECU 92 sets the first stored value PMSM1 currently stored or the latest gradual change value PMSM as the previous gradual change value PMSMi−1. Further, in step S308, the ECU 92 performs the gradual change process according to the equation (4) by the number of gradual change processes T/Δt to compute the gradual change value PMSMi after executing the gradual change process T/Δt times, or equivalently, the gradual change value PMSMi at the time of closing the intake valve 19. Thereafter, the ECU 92 stores the current gradual change value PMSM1 as a second stored value PMSM2.

Assuming that the process of the step S304 has been executed at the time indicated by a one-dot chain line L1 in FIG. 12, the current gradual change value PMSMi computed in that process is stored as the first stored value PMSM1. When the process of step S308 is executed subsequently to the above process, the gradual change value PMSMi at the time of closing the intake valve 19 indicated by a two-dot chain line L2 is computed and the gradual change value PMSMi is stored as the second stored value PMSM2 at around the time indicated by the one-dot chain line L1.

After the processes of storing the first and second stored values PMSM1 and PMSM2 are executed this way, the intake pressure at the time of closing the intake valve 19 can be predicted by using the difference ΔP1 (PMSM2−PMSM1) between the stored values PMSM1 and PMSM2. That is, the intake pressure at the time of closing the intake valve 19 is acquired by adding the difference ΔP1 between stored values PMSM1 and PMSM2 to the real intake pressure PMr that is detected by the vacuum sensor 36 at the present time (one-dot chain line L1).

As the output of the vacuum sensor 36 is affected by the pulsation of the air flowing in the intake passage 32, the output of the vacuum sensor 36 is normally subjected to a filtering process by a CR filter or the like in order to remove the influence. Therefore, the real intake pressure PMr actually deviates from the proper value by the time constant of the CR filter or the like in the filtering process and the predicted intake pressure at the time of closing the intake valve 19 becomes inaccurate accordingly.

The processes of steps S311 to S313 in FIG. 10(b) are to filter the first stored value PMSM1 in consideration of the deviation of the real intake pressure PMr and accurately predict the intake pressure at the time of closing the intake valve 19 by using the filter output PMSM1Si.

As shown in FIG. 10(b), the ECU 92 determines in step S310 whether or not the current combustion mode is the homogeneous charge combustion mode, and proceeds to step S311 if it is the homogeneous charge combustion mode. In step S311, the ECU 92 performs a filtering process on the first stored value PMSM1 based on the following equation (5). In the equation (5), PMSM1Si is the filter output of the first stored value PMSM1 and a predetermined value m is set in such a way that the time constant of that filtering process becomes equal to the time constant of the filtering process by the CR filter.

$$PMSM1Si = PMSM1Si-1 + (PMSM1 - PMSM1Si-1)/m \quad (5)$$

The filter output PMSM1Si obtained based on the equation (5) changes as indicated by the thin solid line in FIG. 12 when the gradual change value PMSM (first stored value PMSM1) changes as indicated by the thick solid line in FIG. 12.

Subsequently, in step S312, the ECU 92 subtracts the filter output PMSM1Si from the second stored value PMSM2 to compute the difference ΔP2 between them. Further, in step S313, the ECU 92 adds the difference ΔP2 to the real intake pressure PMr and computes a resultant value of multiplication of the added value further by the volumetric efficiency ηv as the predicted intake pressure PMFWD, which is the intake pressure at the time of closing the intake valve 19.

The volumetric efficiency ηv is computed based on the previous predicted intake pressure PMFWD and the engine speed NE by referring to an unillustrated map. After the computation of the predicted intake pressure PMFWD, the ECU 92 temporarily terminates this routine and returns to the routine in FIG. 6.

In case where the processes of storing the first and second stored value PMSM1 and PMSM2 are executed at the time indicated by the one-dot chain line L1 in FIG. 12, for example, the filter output PMSM1Si of the first stored value PMSM1 at that time is used in computing the predicted intake pressure PMFWD. That is, the predicted intake pressure PMFWD is computed by adding the difference ΔP2 between the second stored value PMSM2 and the filter output PMSM1Si at the time indicated by the one-dot chain line L1 to the real intake pressure PMr. As a result, even if a deviation according to the time constant of the CR filter occurs in the intake pressure PMr, the predicted intake pressure PMFWD can be computed as the accurate intake pressure at the time of closing the intake valve 19.

When it is determined in the step S310 that the current combustion mode is not the homogeneous charge combustion mode but the stratified charge combustion mode, on the other hand, the flow goes to step S314. In step S314, the ECU 92 computes a resultant value of multiplication of the second stored value PMSM2 by the volumetric efficiency ηv as the virtual intake pressure PMv. The volumetric efficiency ηv is computed based on the previous virtual intake pressure PMv and the engine speed NE by referring to an unillustrated map. After the computation of the virtual intake pressure PMv, the ECU 92 temporarily terminates this routine and returns to the routine in FIG. 6.

The virtual intake pressure PMv is equivalent to the intake pressure at the time of closing the intake valve 19 in the case where it is assumed that the homogeneous charge combustion has been executed in the current running state of the engine, i.e., a virtual value corresponding to the predicted intake pressure PMFWD. In homogeneous charge combustion mode, the predicted intake pressure PMFWD is computed approximately accurately based on the real intake pressure PMr. In stratified charge combustion mode, by way of contrast, the virtual intake pressure PMv is computed based on the second stored value PMSM2, regardless of the real intake pressure PMr, but is computed approximately accurately through the processes of steps S304 and S314.

That is, in the step S304, the predetermined n obtained based on the post-correction intake pressure PMh and the engine speed NE is used in the gradual change process. The map that is used to compute the predetermined n is preset through an experiment or the like in such a way that the virtual intake pressure PMv accurately becomes a value corresponding to the predicted intake pressure PMFWD. In step S314, the volumetric efficiency ηv obtained based on the previous virtual intake pressure PMv and the engine speed NE is used. The map that is used to compute the volumetric efficiency ηv is preset through experiments or the like in such a way that the virtual intake pressure PMv becomes an accurate value.

The embodiment has the following advantages.

Even in case where either the homogeneous charge combustion mode or the stratified charge combustion mode is executed, the intensive target throttle angle TAt is used as a common value for controlling the output torque of the engine 11. The intensive target throttle angle TAt is a value reflecting the engine torque that is demanded in the case where it is assumed that the homogeneous charge combustion has been executed in the current running state of the engine. In other words, the intensive target throttle angle TAt is a target value for the throttle angle suitable for the homogeneous charge combustion mode.

In homogeneous charge combustion mode, the throttle motor 24 is driven in such a way that the real throttle angle TAr approaches the intensive target throttle angle TAt, thereby adjusting the degree of opening of the throttle valve 23. As a result, the amount of intake air is changed to adjust the engine torque to the demanded value. In stratified charge combustion mode, the intake pressure in the case where it is assumed that the homogeneous charge combustion has been executed in the current running state of the engine is computed as the virtual intake pressure PMv based on the intensive target throttle angle TAt. Based on the virtual intake pressure PMv, the basic fuel injection amount Qbse is computed. Then, the fuel injection valve 40 is driven to inject fuel whose quantity corresponds to the final fuel injection amount Qfin obtained from the basic fuel injection amount Qbse into the combustion chamber 16, so that the engine torque is adjusted to the demanded value.

As described above, the torque demanded of the engine 11 is reflected on the intensive target throttle angle TAt in either the homogeneous charge combustion mode or the stratified charge combustion mode. In homogeneous charge combustion mode, the throttle angle is controlled based on the intensive target throttle angle TAt to adjust the engine torque. In stratified charge combustion mode, the fuel injection amount is controlled based on the intensive target throttle angle TAt to adjust the engine torque. In other words, the engine torque is adjusted based on the intensive target throttle angle TAt, which is a common target control value, when either of the two combustion modes is executed. Therefore, the engine torque characteristics can easily be matched between the homogeneous charge combustion mode and the stratified charge combustion mode.

To allow the engine 11 to provide the demanded torque value, the demanded engine torque value should accurately reflected on the intensive target throttle angle TAt. For that purpose, experiments for matching the engine torque value with the intensive target throttle angle TAt are conducted beforehand. According to the embodiment, the engine torque is controlled based on the intensive target throttle angle TAt in either the homogeneous charge combustion mode or the stratified charge combustion mode, the matching experiment has only to be conducted for the intensive target throttle angle TAt. This simplifies experiments associated with the control values for controlling the engine torque.

Based on the basic fuel injection amount Qbse that represents the engine load, the combustion mode to be executed is determined. The basic fuel injection amount Qbse is computed based on the intensive target throttle angle TAt at the time of executing either of the two combustion modes. As the intensive target throttle angle TAt changes in accordance with the value demanded of the engine 11, the basic fuel injection amount Qbse changes also. In other words, at the time of executing either of the two combustion modes, the torque value demanded of the engine 11 is reflected on the basic fuel injection amount Qbse. Therefore, the combustion mode that is suitable for the torque value demanded of the engine 11 is always selected adequately based on the basic fuel injection amount Qbse. In other words, the combustion mode to be executed is determined properly based on the intensive target throttle angle TAt that reflects the demanded torque value.

According to the related art, for example, the basic fuel injection amount is computed based on the acceleration depression amount and the engine speed in stratified charge combustion mode. When a control associated with automatic adjustment of the engine torque is executed, the basic fuel injection amount is corrected in accordance with the torque value demanded of the engine, thereby providing the final fuel injection amount. As fuel whose quantity corresponds to the final fuel injection amount is injected, the engine provides the demanded torque. However, even in case where the final fuel injection amount becomes too large to be suitable for the stratified charge combustion by the correction according to the demanded torque value, the stratified charge combustion mode that has been determined based on the basic fuel injection amount continues. This means that the combustion mode suitable for the demanded torque value is not selected adequately.

According to the embodiment, by way of contrast, if the basic fuel injection amount Qbse becomes too large to be suitable for the stratified charge combustion in accordance with the torque value demanded of the engine 11 in stratified charge combustion mode, the combustion mode is switched to the homogeneous charge combustion. Therefore, the combustion mode suitable for the demanded torque value is selected properly.

The embodiment can be modified as follows, for example.

Although the combustion mode is determined using the basic fuel injection amount Qbse as a value representing the engine load in the embodiment, the present invention is not limited to this type. For example, the combustion mode is determined using the acceleration depression amount ACCP as a value representing the engine load.

Although the engine torque is adjusted by the throttle angle control and fuel injection amount control in the embodiment, the engine torque may be adjusted by other controls, such as the ignition timing control.

What is claimed is:

1. A control device for an engine that generates a torque by burning an air-fuel mixture of air and fuel in a combustion chamber, wherein the engine is operated in a combustion mode selected from a first combustion mode and a second combustion mode, wherein the engine torque is adjusted by first adjusting means when the engine is operated in the first combustion mode and the engine torque is adjusted by second adjusting means, different from the first adjusting means, when the engine is operated in the second combustion mode, wherein the control device comprises:
    computation means for computing a torque-reflected value reflecting an engine torque demanded when the engine is operated in the first combustion mode, based on a running state of the engine;
    first control means for controlling the first adjusting means based on the torque-reflected value when the engine is operated in the first combustion mode; and
    second control means for controlling the second adjusting means based on the torque-reflected value when the engine is operated in the second combustion mode.

2. The control device according to claim 1, wherein the first combustion mode is a homogeneous charge combustion mode in which the air-fuel mixture exists homogeneously in the combustion chamber and the second combustion mode is a stratified charge combustion mode in which the air-fuel mixture is unevenly distributed in the combustion chamber, the first adjusting means includes a throttle valve for adjusting an amount of intake air into the combustion chamber, the second adjusting means includes a fuel injection valve for injecting fuel into the combustion chamber, the first control means adjusts a degree of opening of the throttle valve based on the torque-reflected value and the second control means adjusts an amount of fuel to be injected from the fuel injection valve based on the torque-reflected value.

3. The control device according to claim 2, wherein the torque-reflected value is a target value of the degree of opening of the throttle valve.

4. The control device according to claim 2 wherein, when the engine is operated in the stratified charge combustion mode, the second control means computes, based on the torque-reflected value, a pressure of air to be fed into the combustion chamber on assumption that the homogeneous charge combustion mode has been executed in a present running state of the engine, as a virtual intake pressure, and the second control means further adjusts a fuel injection amount based on the virtual intake pressure.

5. The control device according to claim 4, wherein, when the engine is operated in the stratified charge combustion mode, the second control means computes, based on the torque-reflected value, the degree of opening of the throttle valve on assumption that the homogeneous charge combustion mode has been executed in a present running state of the engine, as a virtual throttle angle, and the second control means further computes the virtual intake pressure based on the virtual throttle angle.

6. The control device according to claim 1, said device further comprising decision means for determining a combustion mode to be executed based on the torque-reflected value.

7. A control device for an engine for generating a torque by burning an air-fuel mixture of air and fuel in a combustion chamber, wherein the engine has a throttle valve for adjusting an amount of intake air into the combustion chamber and a fuel injection valve for injecting fuel into the combustion chamber, and wherein the engine is operated in a combustion mode selected from a homogeneous charge combustion mode and a stratified charge combustion mode, the control device comprising:
    computation means for computing a torque-reflected value reflecting an engine torque demanded when the engine is operated in the homogeneous charge combustion mode, based on a running state of the engine, regardless of a combustion mode which is underway;
    first control means for controlling a degree of opening of the throttle valve based on the torque-reflected value to adjust the engine torque, when the engine is operated in the homogeneous charge combustion mode; and
    second control means for controlling an amount of fuel to be injected from the fuel injection valve based on the torque-reflected value to adjust the engine torque, when the engine is operated in the stratified charge combustion mode.

8. The control device according to claim 7, wherein the computation means computes a target degree of opening of the throttle valve suitable for the homogeneous charge combustion mode as the torque-reflected value.

9. A control method for an engine that generates a torque by burning an air-fuel mixture of air and fuel in a combustion chamber, wherein the engine is operated in a combustion mode selected from a first combustion mode and a second combustion mode, wherein the engine torque is adjusted in accordance with a first control value when the engine is operated in the first combustion mode and the engine torque is adjusted in accordance with a second control value, different from the first control value, when the engine is operated in the second combustion mode, the control method comprising:

a step of computing a torque-reflected value reflecting an engine torque demanded when the engine is operated in the first combustion mode, based on a running state of the engine;

a step of controlling the first control value based on the torque-reflected value when the engine is operated in the first combustion mode; and a step of controlling the second control value based on the torque-reflected value when the engine is operated in the second combustion mode.

10. The control method according to claim 9, wherein the first combustion mode is a homogeneous charge combustion mode in which the air-fuel mixture exists homogeneously in the combustion chamber and the second combustion mode is a stratified charge combustion mode in which the air-fuel mixture is unevenly distributed in the combustion chamber, the step of controlling the first control value based on the torque-reflected value includes a step of adjusting a degree of opening of a throttle valve for adjusting an amount of intake air into the combustion chamber, based on the torque-reflected value, and the step of controlling the second control value based on the torque-reflected value includes a step of adjusting an amount of fuel to be injected into the combustion chamber based on the torque-reflected value.

11. The control device according to claim 3 wherein, when the engine is operated in the stratified charge combustion mode, the second control means computes, based on the torque-reflected value, a pressure of air to be fed into the combustion chamber on assumption that the homogeneous charge combustion mode has been executed in a present running state of the engine, as a virtual intake pressure, and the second control means further adjusts a fuel injection amount based on the virtual intake pressure.

12. The control device according to claim 2, said device further comprising decision means for determining a combustion mode to be executed based on the torque-reflected value.

13. The control device according to claim 3, said device further comprising decision means for determining a combustion mode to be executed based on the torque-reflected value.

14. The control device according to claim 4, said device further comprising decision means for determining a combustion mode to be executed based on the torque-reflected value.

15. The control device according to claim 5, said device further comprising decision means for determining a combustion mode to be executed based on the torque-reflected value.

* * * * *